(12) United States Patent
He et al.

(10) Patent No.: US 11,853,797 B2
(45) Date of Patent: Dec. 26, 2023

(54) METHOD, DEVICE, AND COMPUTER PROGRAM PRODUCT FOR DEPLOYING VISUAL RESOURCE

(71) Applicant: EMC IP Holding Company LLC, Hopkinton, MA (US)

(72) Inventors: Bin He, Shanghai (CN); Danqing Sha, Shanghai (CN); Zhen Jia, Shanghai (CN); Xuwei Tang, Nanjing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 548 days.

(21) Appl. No.: 17/179,636

(22) Filed: Feb. 19, 2021

(65) Prior Publication Data
US 2022/0237032 A1    Jul. 28, 2022

(30) Foreign Application Priority Data

Jan. 25, 2021    (CN) .......................... 202110095513.5

(51) Int. Cl.
*G06F 3/00*    (2006.01)
*G06F 9/50*    (2006.01)
*G06F 9/54*    (2006.01)
*G06F 9/455*    (2018.01)

(52) U.S. Cl.
CPC ............ *G06F 9/5005* (2013.01); *G06F 9/455* (2013.01); *G06F 9/542* (2013.01)

(58) Field of Classification Search
CPC ...................................................... G06F 9/455
USPC .......................................................... 718/104
See application file for complete search history.

(56) References Cited

U.S. PATENT DOCUMENTS

| 2015/0248590 A1* | 9/2015 | Li ................. | G06V 10/267 382/103 |
| 2018/0302296 A1* | 10/2018 | Yu ................. | H04L 41/16 |
| 2021/0110557 A1* | 4/2021 | Busey ................. | G06T 7/521 |
| 2023/0016578 A1* | 1/2023 | Williams ................. | B60W 30/12 |
| 2023/0102929 A1* | 3/2023 | Sjolin ................. | B60W 40/04 701/25 |
| 2023/0148351 A1* | 5/2023 | Kadar ................. | G08G 1/0133 348/149 |

OTHER PUBLICATIONS

Paolo Pagano, Simulating Real-Time Aspects of Wireless Sensor Networks. (Year: 2010).*

(Continued)

*Primary Examiner* — Lechi Truong
(74) *Attorney, Agent, or Firm* — Ryan, Mason & Lewis, LLP

(57) ABSTRACT

The present disclosure relates to a method, a device, and a program product for deploying a visual resource. In one method, a resource requirement of a vision application for the visual resource in a network system is acquired. Based on the resource requirement, the visual resource which will be called by the vision application is predicted. Based on processing capabilities of various edge devices and the visual resource in the network system, an edge device located near a terminal device in the network system is identified, wherein the terminal device is configured to run the vision application. Based on a time requirement in the resource requirement, the visual resource is deployed to the edge device. Further, a corresponding device and a corresponding program product are provided.

20 Claims, 7 Drawing Sheets

(56) References Cited

OTHER PUBLICATIONS

M. Chen et al., "Spatiotemporal GMM for Background Subtraction with Superpixel Hierarchy," IEEE Transactions on Pattern Analysis and Machine Intelligence, vol. 40, No. 6, Jun. 2018, 8 pages.
J. Huang et al., "An Efficient Optical Flow Based Motion Detection Method for Non-stationary Scenes," 2019 IEEE Chinese Control and Decision Conference (CCDC), Jun. 3-5, 2019, pp. 5272-5277.
J. Redmon et al., "You Only Look Once: Unified, Real-Time Object Detection," 2016 IEEE Conference on Computer Vision and Pattern Recognitions (CVPR), Jun. 27-30, 2016, 10 pages.
ETSI, Why Do We Need 5G? etsi.org/technologies/5g?jjj=1604945362863, Accessed Nov. 9, 2020, 6pages.
GSMA, Network Slicing Use Case Requirements, gsma.com/futurenetworks/wp-content/uploads/2018/07/Network-Slicing-Use-Case-Requirements-fixed.pdf, Apr. 2018.
U.S. Appl. No. 17/079,632, filed in the name of Zhen Jia et al. on Oct. 26, 2020, and entitled "Method, Device, and Computer Program Product for Managing Virtual Visual Content."

* cited by examiner

METHOD, DEVICE, AND COMPUTER PROGRAM PRODUCT FOR DEPLOYING VISUAL RESOURCE

RELATED APPLICATION(S)

The present application claims priority to Chinese Patent Application No. 202110095513.5, filed Jan. 25, 2021, and entitled "Method, Device, and Computer Program Product for Deploying Visual Resource," which is incorporated by reference herein in its entirety.

FIELD

Embodiments of the present disclosure relate to resource management and, more particularly, to a method, a device, and a computer program product for deploying a visual resource in a device in a network system.

BACKGROUND

With the development of computer technologies and network technologies, it has been possible to provide various types of visual services to terminal devices such as portable computing devices. For example, a large number of virtual reality (VR) applications, augmented reality (AR) applications, mixed reality applications, and the like have been developed at present. Users can install these vision applications on terminal devices and access a variety of application services provided by a network system. Applications such as VR/AR usually involve a large amount of data, which results in a large amount of time required for creation, rendering, and transmission of visual content, especially for applications involving large three-dimensional models. This puts forward higher requirements for the computing power, storage capacity, and data transmission capacity of the network system.

SUMMARY

Illustrative embodiments of the present disclosure provide a technical solution for deploying a visual resource in a network system in a more convenient and effective manner.

According to a first aspect of the present disclosure, a method for deploying a visual resource is provided. In the method, a resource requirement of a vision application for the visual resource in a network system is acquired. Based on the resource requirement, the visual resource which will be called by the vision application is predicted. Based on processing capabilities of various edge devices and the visual resource in the network system, an edge device located near a terminal device in the network system is identified, wherein the terminal device is configured to run the vision application. Based on a time requirement in the resource requirement, the visual resource is deployed to the edge device.

According to a second aspect of the present disclosure, an electronic device is provided, including: at least one processor; a volatile memory; and a memory coupled to the at least one processor, the memory having instructions stored therein, wherein the instructions, when executed by the at least one processor, cause the device to execute the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

Hereinafter, illustrative embodiments of the present disclosure will be described in more detail with reference to the accompanying drawings. Although illustrative embodiments of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or the same objects. Other explicit and implicit definitions may also be included below.

Figure 1:
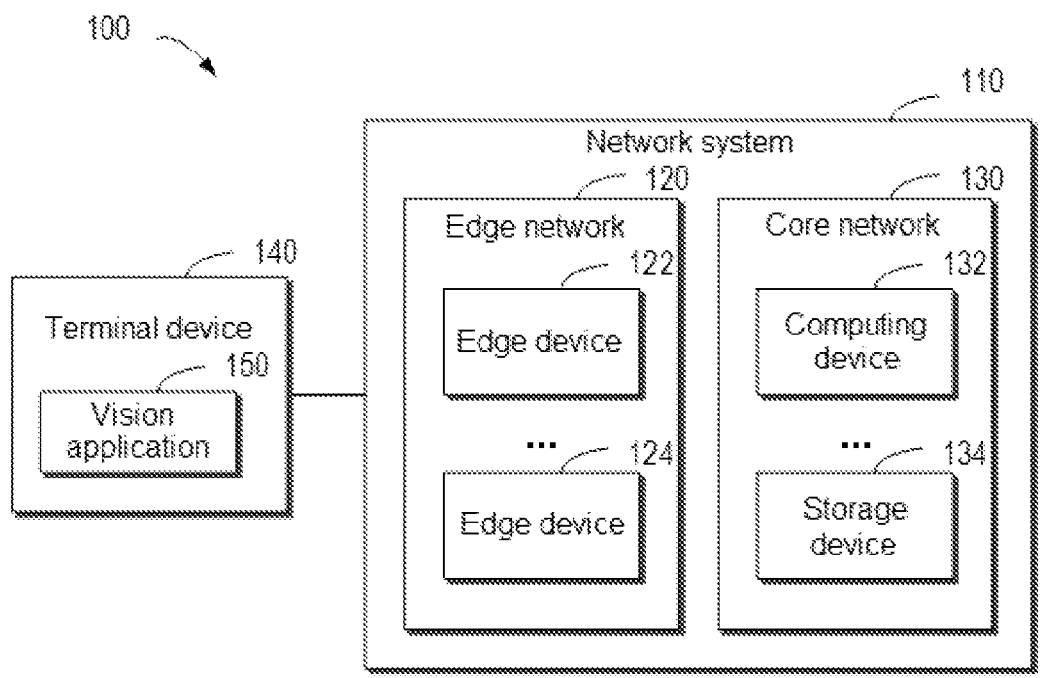
FIG. 1 schematically illustrates a block diagram of an application environment in which example implementations of the present disclosure may be implemented.

For ease of description, an application environment according to an example implementation of the present disclosure will be described first with reference to FIG. 1. FIG. 1 schematically illustrates a block diagram of application environment 100 in which example implementations of the present disclosure may be implemented. As shown in FIG. 1, network system 110 may include core network 130 and edge network 120. Here, core network 130 may include computing device 132, . . . , storage device 134 with relatively higher capability hardware configurations, and edge network 120 may include edge devices 122, . . . , 124 with relatively lower capability hardware configurations. Terminal device 140 can run various types of applications, and an edge device can process some or all requests from various applications. If the performance of the edge device does not meet the requirement of an application, the device in core network 130 can process the request.

Terminal device 140 may run vision application 150 (such as a VR application, an AR application, and a mixed reality application). Compared with an ordinary application, vision application 150 will involve a large amount of data transmission, and also has a high requirement for the real-time transmission. At this time, how to deploy various visual resources involved in vision application 150 in network system 110 has become an important area of research.

Technical solutions of edge-based computing have been proposed at present. For example, a required visual resource can be loaded to one or more edge devices in advance according to a current call of a terminal device, so as to provide the required visual resource to the terminal device. However, the vision application involves a large amount of data and requires a long time to transmit data. Therefore, the existing technical solutions cannot guarantee that a vision application receives the visual resource in time, which in turn causes latency of the vision application.

It will be understood that early prediction is essential for the vision application that requires low latency. In order to address the above defects, a method for deploying a visual resource is provided according to an example implementation of the present disclosure. Specifically, one or more embodiments disclosed herein provide a prediction engine, which can predict events that will occur in the future and require deployment, update, and/or redeployment of a visual resource. By using the example implementation of the present disclosure, the required visual resource can be predicted in advance, and the visual resource can be transmitted accurately in time, thereby providing a smooth user experience. Here, the prediction engine can continuously work to monitor changes in the visual resource requirement and network state, thereby further optimizing the overall efficiency of the network system.

Figure 2:
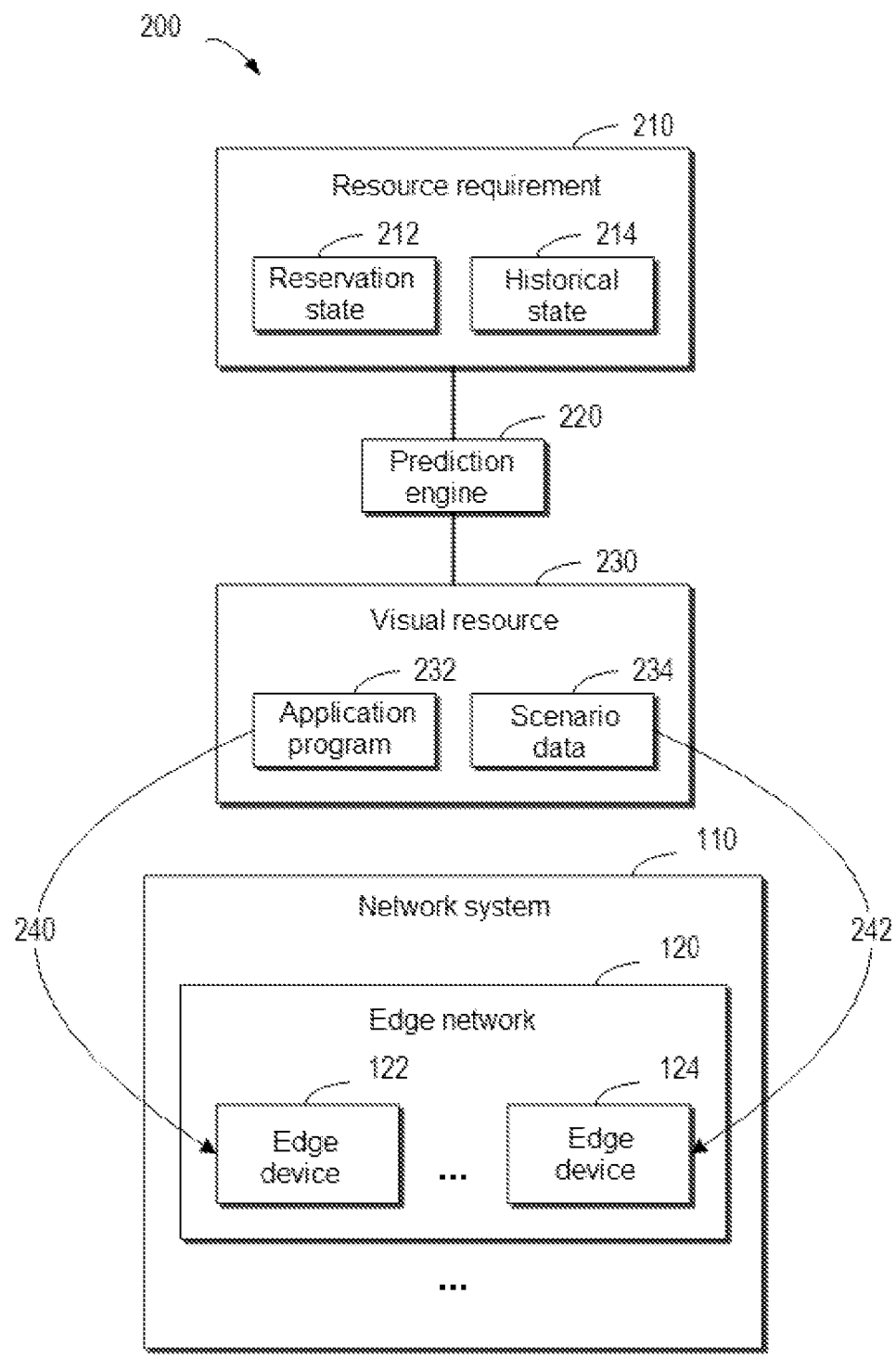
FIG. 2 schematically shows a block diagram of a process for deploying a visual resource according to an example implementation of the present disclosure.

An example implementation according to the present disclosure will be described first with reference to FIG. 2. FIG. 2 schematically shows a block diagram of process 200 for deploying a visual resource according to an example implementation of the present disclosure. As shown in FIG. 2, resource requirement 210 of vision application 150 for a visual resource in network system 110 can be acquired (for example, it may be acquired based on reservation state 212 and historical state 214 of vision application 150). Further, prediction engine 220 may be used to predict visual resource 230 which will be called by vision application 150. Here, visual resource 230 may include resources in two aspects, that is, application program 232 and scenario data 234.

Further, based on processing capabilities of various edge devices and required visual resource 230 in network system 110, a suitable edge device located near terminal device 140 can be searched for, so as to deploy visual resources 230 to the edge device based on a time requirement in resource requirement 210. As shown by arrow 240 in FIG. 2, application program 232 can be deployed to edge device 122; and as shown by arrow 242, scenario data 234 can be deployed to edge device 124.

By using the example implementation of the present disclosure, the edge device may have enough time to process the transmission of visual resource 230 and the subsequent processing (such as decompression, decoding, and instantiation) of visual resource 230. In this way, it can avoid pausing and interrupting vision application 150.

In addition, prediction engine 220 can provide sufficient time for the capability evaluation and selection of edge devices. The capabilities (such as bandwidth capabilities, computing capabilities, and storage capabilities) of various devices in network system 110 can be considered as a whole, and all resources of network system 110 can be aggregated and shared. In this way, the latency of vision application 150 can be reduced through the pre-deployment of visual resource 230 without increasing hardware facilities of the network system. Hereinafter, more details of an example implementation according to the present disclosure will be described with reference to FIG. 3.

Figure 3:
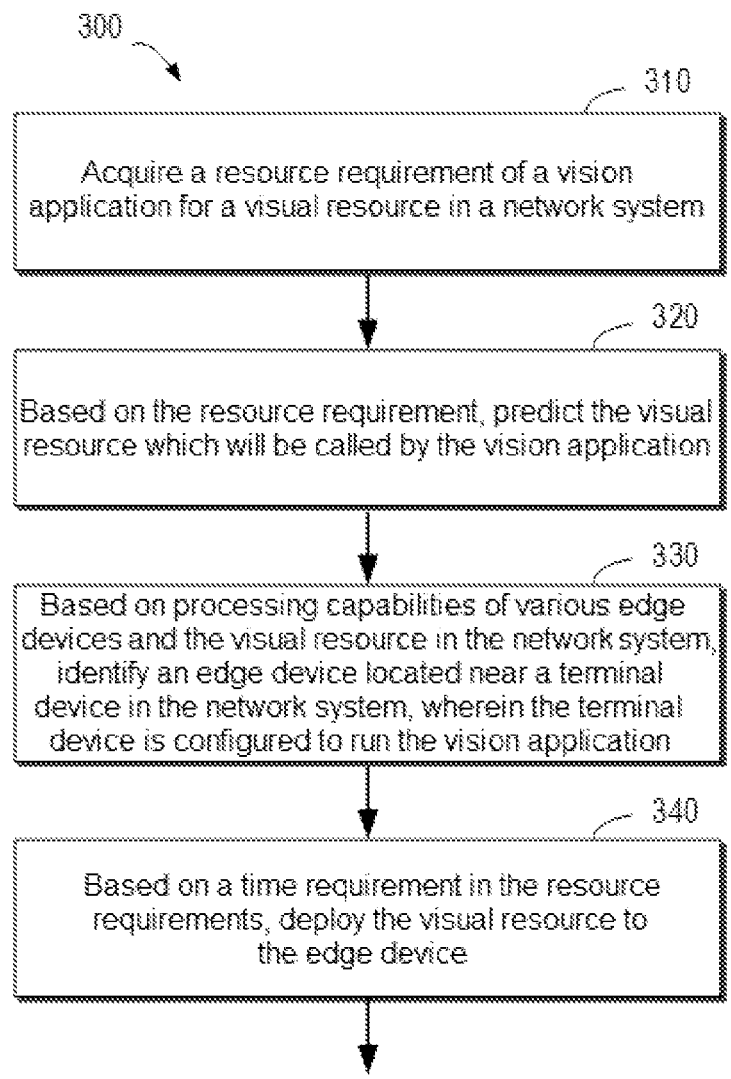
FIG. 3 schematically shows a flow chart of a method for deploying a visual resource according to an example implementation of the present disclosure.

FIG. 3 schematically shows a flow chart of method 300 for deploying a visual resource according to an example implementation of the present disclosure. At block 310, resource requirement 210 of vision application 150 for a visual resource in network system 110 is acquired. It will be understood that there may be two situations in running of vision application 150: vision application 150 has already been run at terminal device 140, and vision application 150 has not yet been run at terminal device 140. The above two situations will be described in detail respectively below.

According to an example implementation of the present disclosure, vision application 150 has not been started yet, and it can be determined that vision application 150 has not been run by terminal device 140 at this time. A reservation for the visual resource in network system 110 can be acquired from a network event calendar of network system 110. It will be understood that the network event calendar can describe various events that will occur in network system 110. An individual user and/or a group user can add a reservation request to the network event calendar to request running of a certain vision application at a specified time. It is assumed that a certain community will hold a VR game contest at 10 AM on Saturday, an organizer can add a reservation to the network event calendar. By using the example implementation of the present disclosure, various visual resources related to the game can be loaded to an edge device near an access point of the community before 10 o'clock (for example, one day or several hours in advance).

According to an example implementation of the present disclosure, a time requirement may be determined based on the time of the reservation (for example, 10 AM on Saturday), and resource requirement 210 of the visual resource may be determined based on the reservation. More details of the event, such as time, season, location, and site size, can be further determined based on the reservation. The scale of the event may be predicted by using linear regression and the like, or the nearest historical record may be found by using a distance function measurement algorithm and the like. In this way, basic information of the event can be obtained to determine the name of the vision application, the locations of access points and the number of a large number of terminal devices that will run the vision application, the required uplink and downlink bandwidths, and the like.

According to an example implementation of the present disclosure, if vision application 150 has been started, it can be determined that vision application 150 has been run on terminal device 140 at this time. The relevant time requirement can be determined based on the current time. Further, a historical state of the resource occupied by vision application 150 during a historical time period can be acquired, and resource requirement 210 related to this call can be determined based on the historical state. It will be understood that the resource may include any of one of a computing resource, a storage resource, and a bandwidth resource. For example, requirements of this call for the application program and scenario data may be determined.

At block 320, based on resource requirement 210, visual resource 230 which will be called by vision application 150 is predicted. According to an example implementation of the present disclosure, the prediction may be performed based on a statistical analysis/machine learning method. Visual resource 230 which will be called by terminal device 140 can be determined based on a prediction model and the historical state. A variety of technologies that have been developed in the past and/or will be developed in the future can be used to train the prediction model so that the prediction model can include an association relationship between a state of a resource occupied by the terminal device and the visual resource which will be called by the terminal device. Then, prediction engine 220 can determine visual resource 230 needed in the future based on current resource requirement 210 and the prediction model.

In the above example of the VR game contest, historical data related to the VR game can be acquired in order to determine related locations and user behavior preferences, and the like. Furthermore, a next peak data time period can be predicted, and the upcoming visual resource call of a specific edge device can be predicted by using an autoregressive integrated moving average (ARIMA), a long-short-term memory network, or the like. For example, the daily data traffic related to VR games in the past 10 days may be used as an input, and the data traffic during the VR game contest can be predicted. According to an example implementation of the present disclosure, it is even possible to accurately predict the peak data traffic in a specific time period (for example, 10:30 AM-11:00 AM). In an example where the VR game has been started, changes in resource occupancy can be monitored in real time, and then visual resources 230 that the terminal device 140 needs to call at present and in the future can be predicted. The prediction engine can be used to determine, based on the resource requirements collected by a perception module, visual resources that will be provided by network system 110.

According to an example implementation of the present disclosure, reservation and real-time monitoring may be combined. For example, the calendar event of the vision application that is about to be started, the state statistics of the vision application that has been started, and other data inputs that can be detected may be monitored for prediction. The above detected data may be fused to form a feature vector for representing resource requirement 210. Then, the feature vector may be input to a prediction model acquired in advance to determine visual resource 230 to be called.

With the example implementation of the present disclosure, visual resource 230 required by vision application 150 can be continuously predicted based on the requirements (for example, long-term, short-term, and current requirements) of vision application 150. Then, visual resource 230 that will be called in the future may be deployed, updated, or redeployed at each device in network system 110. In this way, terminal device 140 can cooperate with various devices in network system 110 more intelligently and effectively, and make full use of the computing capabilities, storage capabilities, and bandwidth capabilities of the various devices, thereby providing active optimization services and reducing user waiting time.

Figure 4:
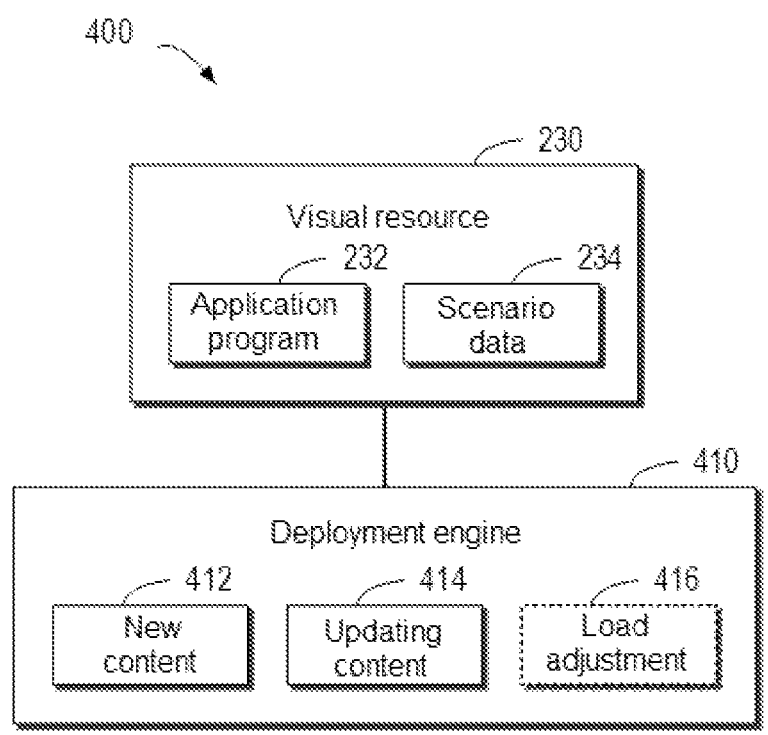
FIG. 4 schematically shows a block diagram of different types of deployment of a visual resource according to an example implementation of the present disclosure.

Hereinafter, more details about distribution of visual resource 230 will be described with reference to FIG. 4. FIG. 4 schematically shows a block diagram of different types of deployment 400 of visual resources according to an example implementation of the present disclosure. According to an example implementation of the present disclosure, a visual resource library may be established in advance. As shown in FIG. 4, the visual resource library may include application programs 232 and scenario data 234 which will be called by various vision applications. For example, visual resources of a VR game may include application programs related to computing, presentation, and the like called by the VR game, and may also include various game scenario-related 3D models loaded by the VR game and related textures, materials, and lighting related data, and the like.

According to an example implementation of the present disclosure, deployment engine 410 may deploy various visual resources in network system 110. For example, the type of deployment may include: new content 412, updating content 414, load adjustment 416, and the like. Deployment engine 410 may first determine a destination to which visual resource 230 needs to be deployed, and then deploy visual resource 230 to the destination. Hereinafter, more details about deployment engine 410 will be described with reference to FIG. 3 as well as blocks 330 and 340.

At block 330 in FIG. 3, an edge device located near terminal device 140 in network system 110 is identified based on processing capabilities of various edge devices and visual resource 230 in network system 110. Terminal device 140 here can run vision application 150. At this time, vision application 150 may have been run, or it may not have been run yet. Visual resource 230 which will be called by vision application 150 may have various virtual network functions. For example, vision application 150 may include application programs for performing the following functions: perception, drawing, and encoding/decoding. At the same time, various devices in network system 110 may have different processing capabilities. In this case, a suitable device may be selected as a deployment destination based on both the function of visual resource 230 and the processing capabilities of the devices.

Taking a historical site AR navigation application as an example, the application can perceive the geographic location where terminal device 140 is located, and can present the original three-dimensional appearance of the historical site in real time based on changes in the geographic location. For another example, vision application 150 may include artificial intelligence (AI) and machine learning (ML) libraries in order to provide related services in a virtual world in response to user input and/or location changes based on the edge computing technology. For another example, for an AR application, a mapping relationship between the real world and the virtual world, and the like can be determined based on the AI/ML library.

Figure 5:
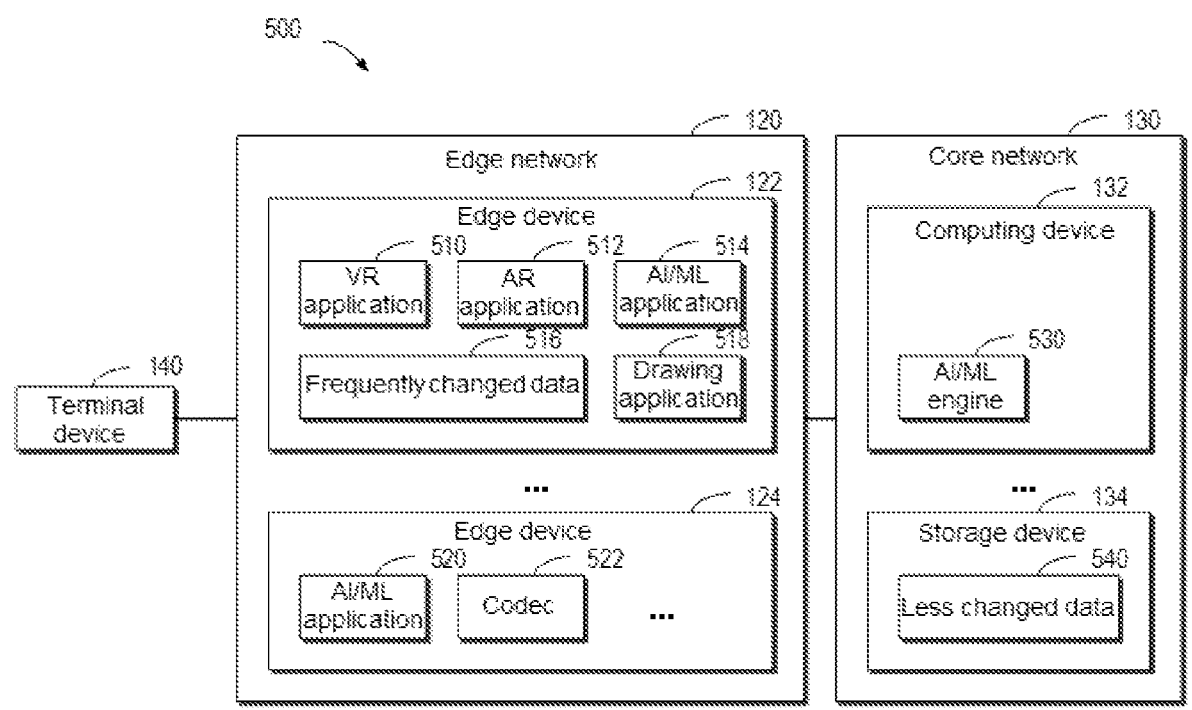
FIG. 5 schematically illustrates a block diagram of a process for deploying a visual resource to various devices in a network system according to an example implementation of the present disclosure.

FIG. 5 schematically illustrates a block diagram of process 500 for deploying visual resource 230 to various devices in network system 110 according to an example implementation of the present disclosure. As shown in FIG. 5, terminal device 140 may be connected (for example, via an access point) to edge network 120, and then to core network 130. Various edge devices 122, . . . , 124 may have different processing capabilities. At this time, a suitable deployment destination can be selected from network system 110 based on the type of the visual resource and the processing capabilities of the various devices.

According to an example implementation of the present disclosure, different types of vision applications have different requirements on functions and performance. For example, strong interaction VR applications require low-latency voice and video coding services; although weak interaction VR applications do not require extremely low latency, they still have special requirements on the transmission rate and packet loss rate. At this time, the resource requirements may be mapped to a resource template corresponding to the vision application, so as to identify the edge device based on the comparison of the processing capabilities of the various edge devices with the resource template. For example, a template may be defined for each vision application, and decompose the actual requirements into aspects related to a computing resource, a storage resource, a bandwidth resource, and the like. For example, a template may be defined as shown in Table 1 below.

TABLE 1

Examples of Templates for Vision Applications

| Serial number | Parameter | Requirement |
|---|---|---|
| 1 | Throughput | 200 Mbps |
| 2 | Latency time (RTT) | 10 milliseconds |
| 3 | Packet loss | 1.00E−6 |
| 4 | Storage | 1 G |
| 5 | Computing | Require hardware acceleration |
| ... | | |

It will be understood that Table 1 above only schematically shows a requirement template for basic three-dimensional services. According to an example implementation of the present disclosure, an intermediate requirement template, an advanced requirement template, and the like may also be provided for vision applications with other requirements. According to an example implementation of the present disclosure, functions provided by various devices in the network system may be matched with the requirement template, so as to determine the most suitable destination for visual resource deployment. According to an example implementation of the present disclosure, an edge device may be identified based on the comparison of the processing capabilities of the various edge devices with the resource template. By using the example implementation of the present disclosure, a strategy of deploying visual resources may be determined according to the requirements of different types of vision applications.

According to an example implementation of the present disclosure, at least any one of the priority and the frequency of change associated with the resource requirements can be further acquired. Then, the edge device may be identified based on at least any one of the priority and the frequency of change, and the location of an access point where the terminal device accesses the network system. For example, a high priority may be set for resource requirements with high real-time requirements, so as to provide services for these resource requirements preferentially. According to an example implementation of the present disclosure, VR/AR resources may have different access frequencies, some content is relatively fixed, and some content is continuously updated with changes in geographic location and time. For frequently accessed VR/AR resources, they may be placed near the terminal device (for example, the edge device close to the terminal device in the edge network) to ensure that the terminal device can quickly acquire these resources. Since the content of these resources is relatively fixed, the terminal device does not need to access these resources frequently, so the bandwidth occupied by resource transmission can be reduced.

According to an example implementation of the present disclosure, visual resource 230 may be encapsulated into different data packets. The requirements in terms of the computing resource, the storage resource, and the bandwidth resource for each data packet can be determined. Further, the priority, update frequency, or frequency of interaction with the user related to the content in such data packets may be determined, thereby selecting a suitable destination for each data packet. Generally speaking, a closer network distance between visual resource 230 and terminal device 140 results in a shorter time for terminal device 140 to access visual resource 230, and thus visual resource 230 is sent to the edge device closest to terminal device 140 preferentially. The priority may be set for each data packet separately, so as to make full use of each storage device in network system 110 to minimize the latency, reduce costs, and improve end users' satisfaction with the virtual experience.

According to an example implementation of the present disclosure, a bandwidth requirement of vision application 150 may be acquired in real time. If it is determined that a large-scale event will occur, it may be checked whether current edge devices can meet the bandwidth requirement. Vision application 150 may request bandwidth allocation from the current edge device through a bandwidth management (BWM) application programming interface (API). Specifically, vision application 150 may use the BWM API to register required bandwidth allocation in a static and/or dynamic manner. If the edge device does not have enough available bandwidth resources, the bandwidth management service may inform vision application 150 that the edge device cannot support the required bandwidth request. Then, vision application 150 may request a bandwidth resource from another edge device in the surrounding area.

Vision application 150 may select, through an edge network information service (ENIS), an edge device to perform mobile edge computing. The ENIS service may provide a list of computing capabilities of various edge devices, so that vision application 150 can acquire configurations and states of the various edge devices. Specifically, a suitable edge device may be selected based on a combination of the following conditions: distances between the edge device and adjacent edge devices, available bandwidth resources, hardware configuration (including CPU, memory resources, and the like), whether it has a special foundation computing accelerator (such as GPU, TPU, or codec accelerator).

At block 340 of FIG. 3, based on the time requirement in the resource requirements, visual resource 230 is deployed to the edge device identified at block 330. Generally speaking, the visual resource placed on the nearest edge device requires low latency, and different vision applications may have different priorities. For a vision application with a relatively low latency requirement, the visual resource involved may be moved or copied to a terminal device slightly farther from terminal device 140 (for example, edge device 124 shown in FIG. 5). At this time, the edge device (for example, edge device 122) closest to terminal device 140 may be allocated to a vision application that requires extremely low latency, thereby ensuring low latency and high throughput characteristics of the entire network system. For example, AWL-type applications may be deployed on devices with higher computing capabilities. For another example, a vision application and a high-performance drawing application program with very strict time requirements can be deployed on edge device 122 close to terminal device 140, thereby reducing network latency.

As shown in FIG. 5, visual resource 230 may be deployed at the edge device in edge network 120 and various devices in core network 130. As shown in FIG. 5, edge device 122 is the device closest to terminal device 140. Edge device 122 may include VR application 510, AR application 512, AI/ML application 514, frequently changed data 516, drawing application 518, and the like. Edge device 124 is an adjacent device of edge device 122, and may include AWL application 520, codec-related application 522, and the like that are less sensitive to latency. Further, computing device 132 in core network 130 may include AI/ML engine 530 that requires high computing performance, storage device 134 may include less changed data 540, and the like.

According to an example implementation of the present disclosure, a list of visual resources may be established in order to manage all visual resources associated with vision application 150. At this time, when vision application 150 needs to call a certain visual resource, it may search the list in order to find the required visual resource from the corresponding device. It will be understood that the content of the list will be changed over time. Therefore, when the deployment of visual resources is changed, the list may be updated.

The process of deploying visual resources 230 is described above only by taking the type of new content 412 as an example. According to an example implementation of the present disclosure, updating content 414 may also be involved in the deployment. Here, updating content 414 refers to the need to redeploy a visual resource in order to present the changed content to the user in the running process of vision application 150. For example, when a VR game user moves to a new geographic location in the virtual world, surrounding scenario data needs to be supplemented or updated. The edge device associated with the visual resource to be updated may be determined in the manner described above, and then the updated visual resource is deployed to the determined edge device. For another example, a user of the AR navigation application can move forward in the real world, which will cause changes in the location of the user in the virtual world. Therefore, it is necessary to provide a new visual resource to the vision application based on the changed location. For example, ruins of a certain building are in front of the user, and when the user moves toward the ruins, a three-dimensional restoration model of the building may be displayed at a location corresponding to the ruins in the virtual world.

According to an example implementation of the present disclosure, the developer of vision application 150 may continuously update the visual resource involved in vision application 150. For example, as the VR game version is updated, the game may involve a new game scenario. The updated visual resource may be redeployed to the selected edge device. Alternatively and/or additionally, a suitable edge device may be selected for the new game scenario.

It will be understood that the edge device may have limitations in terms of the computing resource, the storage resource, and the bandwidth. Therefore, visual resources deployed to the edge device may be determined based on the capability detection of the edge devices. The most suitable destination for deploying the visual resources may be determined based on the capabilities of the various edge devices. Specifically, in the running process of vision application 150, the workload of various devices in network system 110 may continuously change, thereby leading to load adjustment 416 type of deployment. Load adjustment 416 refers to the need to redeploy visual resources when the workload (for example, including any one of the computing resource, the storage resource, and the bandwidth resource) of a certain device is about to exceed a safety threshold. For example, when the number of game players continues to increase so that the workload of a certain device exceeds the safety threshold, services provided to some players may be "offloaded" to another device in the network system. By using the example implementation of the present disclosure, the deployment of visual resources can be continuously adjusted through real-time monitoring and prediction.

Figure 6:
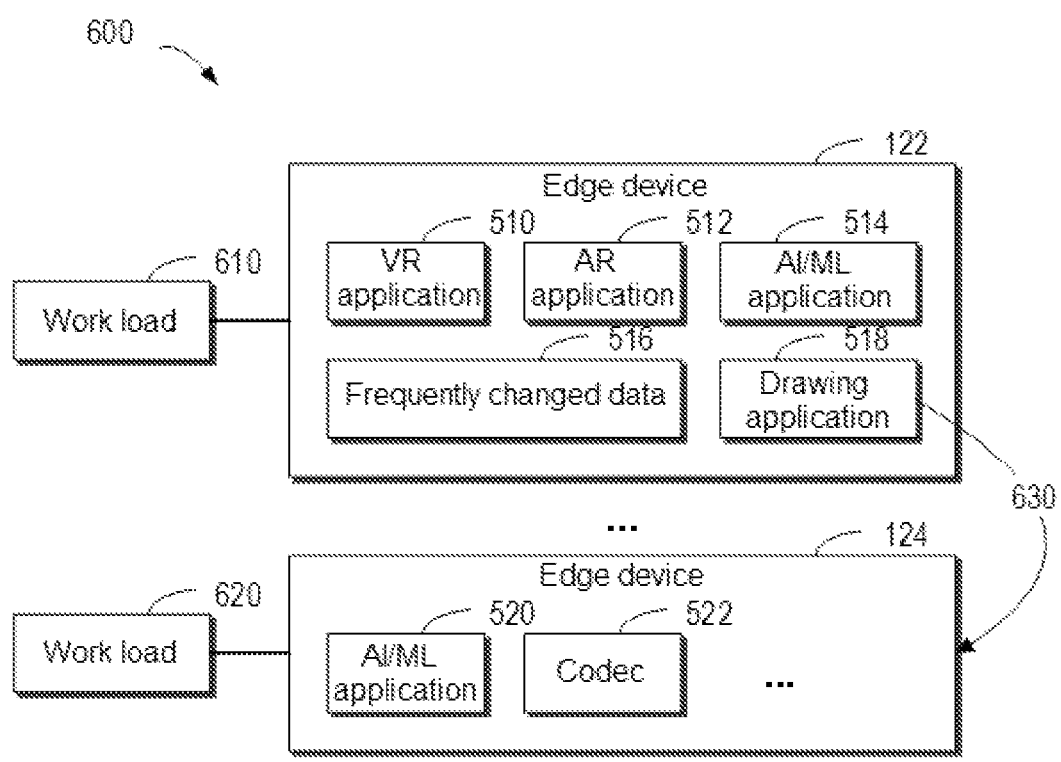
FIG. 6 schematically illustrates a block diagram of a process of migrating a visual resource between various devices in a network system according to an example implementation of the present disclosure.

FIG. 6 schematically illustrates a block diagram of process 600 of migrating a visual resource between various devices in a network system according to an example implementation of the present disclosure. As shown in FIG. 6, when it is found that the workload 610 of edge device 122 is too high and is not suitable for drawing application 518, as indicated by arrow 630, drawing application 518 may be migrated from edge device 122 to edge device 124 with a lower workload 620. In this way, edge device 124 can provide a richer computing resource to support real-time rendering of drawing application 518.

According to an example implementation of the present disclosure, the deployment of a visual resource may be retained or terminated according to a predefined rule. For example, before reserved vision application 150 is started, visual resource 230 to be called may be deployed to a corresponding device. After vision application 150 has been started, the state of vision application 150 may be continuously monitored, so as to continuously predict visual resource 230 which will be called by the vision application based on the historical state that has occurred, and execute the loading process accordingly. According to an example implementation of the present disclosure, monitoring on the state of the vision application may be stopped.

The process of deploying visual resource 230 in network system 110 has been described above with reference to FIG. 2 to FIG. 6. In the following, the process of deploying visual resource 230 will be described as a whole by taking the VR game contest and the AR navigation application as examples respectively. In one example, it is expected that a VR game contest will be held at 10 AM on Saturday, and an organizer may first make a reservation in the calendar. For example, the name of the specific VR game involved in the game contest, the venue, the number of predetermined participants, the bandwidth, and the like may be specified. Prediction engine 220 may receive the subscription calendar and prepare for the game contest on Saturday based on the reservation event in the calendar. For example, prediction engine 220 may make statistics on the bandwidth, computing resource, and storage resource that each user may occupy based on historical data related to the VR game, and then pre-deploy corresponding visual resources for the game contest. Further, one or more edge devices near the venue may be determined in advance (for example, 1 day in advance) according to various resource requirements, and corresponding visual resources may be deployed to the edge devices.

According to an example implementation of the present disclosure, the various edge devices may be sorted according to quantities of resources that can be provided by the various edge devices. An appropriate edge device may be selected according to both distances between the various edge devices and the access point in the hosting area and the quantities of resources. At this time, the edge devices will pre-store visual resources needed for the game contest and meet the corresponding requirements on the bandwidth, computing resource, and storage resource. Furthermore, since there may be a large amount of concurrent data access during the game contest, visual resources may be cached at a plurality of edge devices in the edge network. Data packets of the visual resources may be divided and deployed according to the access frequency of the visual resources, and the frequently accessed data packets may be deployed on the edge device closest to the access point.

The drawing application may be deployed on an edge device close to the access point as much as possible to maximize the advantages of low latency and high throughput. Visual resources involving high computing power requirements may be deployed in a device with a better hardware configuration (for example, an edge device with a higher capability configuration in the edge network or a computing device in the core network) as much as possible. Visual resources involving data uploading and sharing may be deployed close to the access point to avoid network congestion and bandwidth bottlenecks.

In another example, a user may use the AR navigation application to visit a historical site. The user may use terminal device 140 to photograph a scene (for example, a historical site) in front of him/her in real time. At this time, the AR application will superimpose a three-dimensional restoration model of the historical site corresponding to the current location on a display of the terminal device. A navigation route may be set in the AR application in advance, and a visual resource may be deployed in advance before the user actually enters each area.

By using the example implementation of the present disclosure, long-term, short-term, and current requirements of vision application 150 may be continuously detected, so as to continuously predict visual resource 230 required by vision application 150. In this way, the required resource may be preloaded to a storage location that is convenient for terminal device 140 to access, thereby reducing the latency caused by data transmission.

Examples of the method according to the present disclosure have been described in detail above with reference to FIG. 2 to FIG. 6, and implementations of a corresponding apparatus will be described below. According to an example implementation of the present disclosure, an apparatus for deploying a visual resource is provided. The apparatus includes: acquiring resource requirements of a vision application for the visual resource in a network system; based on the resource requirements, predicting the visual resource which will be called by the vision application; based on processing capabilities of various edge devices and the visual resource in the network system, identifying an edge device located near a terminal device in the network system, wherein the terminal device is configured to run the vision application; and based on a time requirement in the resource requirements, deploying the visual resource to the edge device. According to the example implementation of the present disclosure, the apparatus further includes modules used for executing other steps of the method 300 described above.

Figure 7:
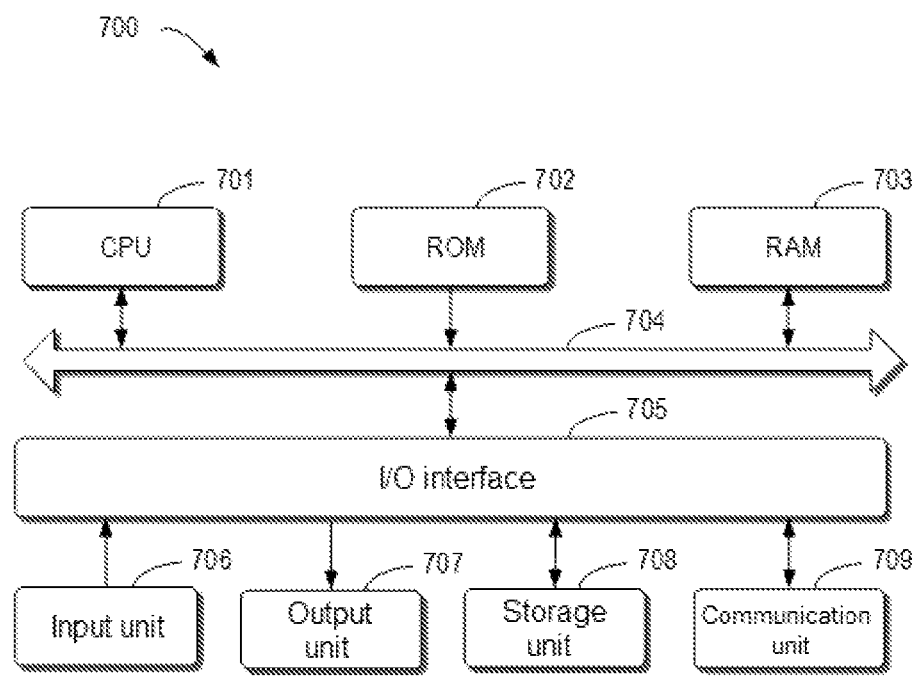
FIG. 7 schematically illustrates a block diagram of a device for deploying a visual resource according to an example implementation of the present disclosure.

FIG. 7 schematically illustrates a block diagram of device 700 for managing a data mode according to an example implementation of the present disclosure. As shown in the figure, device 700 includes central processing unit (CPU) 701 that may perform various appropriate actions and processing according to computer program instructions stored in read-only memory (ROM) 702 or computer program instructions loaded from storage unit 708 into random access memory (RAM) 703. In RAM 703, various programs and data required for the operation of storage device 700 may also be stored. CPU 701, ROM 702, and RAM 703 are connected to each other through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as method 300, may be performed by CPU 701. For example, in some implementations, method 300 may be implemented as a computer software program that is tangibly included in a machine-readable medium, such as storage unit 708. In some implementations, part or all of the computer program may be loaded and/or installed onto device 700 via ROM 702 and/or communication unit 709. One or more steps of method 300 described above may be performed when the computer program is loaded into RAM 703 and executed by CPU 701. Alternatively, in other implementations, CPU 701 may also be configured in any other suitable manner to implement the above processes/methods.

According to an example implementation of the present disclosure, an electronic device is provided, including: at least one processor; a volatile memory; and a memory coupled to the at least one processor, the memory having instructions stored therein, wherein the instructions, when executed by the at least one processor, cause the device to perform a method for deploying a visual resource. The method includes: acquiring resource requirements of a vision application for the visual resource in a network system; based on the resource requirements, predicting the visual resource which will be called by the vision application; based on processing capabilities of various edge devices and the visual resource in the network system, identifying an edge device located near a terminal device in the network system, wherein the terminal device is configured to run the vision application; and based on a time requirement in the resource requirements, deploying the visual resource to the edge device.

According to an example implementation of the present disclosure, acquiring the resource requirements includes: in response to a determination that the vision application has not been run by the terminal device, acquiring a reservation for the visual resource in the network system from a network event calendar of the network system; determining the time requirement of the resource requirements based on the reserved time; and determining the resource requirement for the visual resource based on the reservation.

According to an example implementation of the present disclosure, acquiring the resource requirements includes: in response to a determination that the vision application has been run by the terminal device, determining the time requirement of the resource requirements based on the current time; acquiring a historical state of a resource occupied by the vision application during a historical time period, the resource including any one of a computing resource, a storage resource, and a bandwidth resource; and determining the resource requirements based on the historical state.

According to an example implementation of the present disclosure, predicting the visual resource which will be called by the vision application includes: based on a prediction model and the historical state, determining the visual resource which will be called by the terminal device, the prediction model including an association relationship between a state of the resource occupied by the terminal device and the visual resource which will be called by the terminal device.

According to an example implementation of the present disclosure, identifying the edge device further includes: acquiring at least any one of the priority and the frequency of change associated with the resource requirements; and identifying the edge device based on at least any one of the priority and the frequency of change, and a location of an access point where the terminal device accesses the network system.

According to an example implementation of the present disclosure, the method further includes: updating the edge device based on a change in the location of the access point.

According to an example implementation of the present disclosure, identifying the edge device includes: mapping the resource requirements to a resource template corresponding to the vision application; and identifying the edge device based on a comparison of the processing capabilities of the various edge devices with the resource template.

According to an example implementation of the present disclosure, the method further includes: in response to a determination that the visual resource is updated, re-deploying the updated visual resource to the edge device.

According to an example implementation of the present disclosure, the visual resource includes at least any one of the following: an application program which will be called by the vision application, and scenario data which will be loaded by the vision application.

According to an example implementation of the present disclosure, the vision application includes at least any one of the following: a virtual reality application, an augmented reality application, and a mixed reality application.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example embodiment of the present disclosure, a computer-readable medium is provided. The computer-readable medium stores machine-executable instructions that, when executed by at least one processor, cause the at least one processor to implement the method according to the present disclosure.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, and to otherwise enable persons of ordinary skill in the art to understand the implementations disclosed here.

What is claimed is:

1. A method for deploying a visual resource, comprising: acquiring a resource requirement of a vision application for the visual resource in a network system;
based on the resource requirement, predicting the visual resource which will be called by the vision application;
based on processing capabilities of various edge devices and the visual resource in the network system, identifying an edge device located near a terminal device in the network system, wherein the terminal device is configured to run the vision application; and
based on a time requirement in the resource requirement, deploying the visual resource to the edge device;
wherein identifying the edge device further comprises:
acquiring at least any one of a priority and a frequency of change associated with the resource requirement; and
identifying the edge device based on the at least any one of the priority and the frequency of change, and a location of an access point where the terminal device accesses the network system.

2. The method according to claim 1, wherein acquiring the resource requirement comprises: in response to a determination that the vision application has not been run by the terminal device,
acquiring a reservation for the visual resource in the network system from a network event calendar of the network system;
determining the time requirement of the resource requirement based on a reserved time; and
determining the resource requirement for the visual resource based on the reservation.

3. The method according to claim 1, wherein acquiring the resource requirement comprises: in response to a determination that the vision application has been run by the terminal device,
determining the time requirement of the resource requirement based on the current time;
acquiring a historical state of a resource occupied by the vision application during a historical time period, the resource comprising any one of a computing resource, a storage resource, and a bandwidth resource; and
determining the resource requirement based on the historical state.

4. The method according to claim 3, wherein predicting the visual re source which will be called by the vision application comprises:
based on a prediction model and the historical state, determining the visual resource which will be called by the terminal device, the prediction model comprising an association relationship between a state of the resource occupied by the terminal device and the visual resource which will be called by the terminal device.

5. The method according to claim 1, further comprising: updating the edge device based on a change in the location of the access point.

6. The method according to claim 1, wherein identifying the edge device further comprises:
mapping the resource requirement to a resource template corresponding to the vision application; and
identifying the edge device based on a comparison of the processing capabilities of the various edge devices with the resource template.

7. The method according to claim 1, further comprising: in response to a determination that the visual resource is updated, re-deploying the updated visual resource to the edge device.

8. The method according to claim 1, wherein the visual resource comprises at least any one of the following: an application program which will be called by the vision application, and scenario data which will be loaded by the vision application.

9. The method according to claim 8, wherein the vision application comprises at least any one of the following: a virtual reality application, an augmented reality application, and a mixed reality application.

10. An electronic device, comprising:
at least one processor;
a volatile memory; and
a memory coupled to the at least one processor and having instructions stored therein, wherein the instructions, when executed by the at least one processor, cause the electronic device to perform a method for deploying a visual resource, the method comprising:
acquiring a resource requirement of a vision application for the visual resource in a network system;
based on the resource requirement, predicting the visual resource which will be called by the vision application;
based on processing capabilities of various edge devices and the visual resource in the network system, identifying an edge device located near a terminal device in the network system, wherein the terminal device is configured to run the vision application; and
based on a time requirement in the resource requirement, deploying the visual resource to the edge device;
wherein identifying the edge device further comprises:
acquiring at least any one of a priority and a frequency of change associated with the resource requirement; and
identifying the edge device based on the at least any one of the priority and the frequency of change, and a location of an access point where the terminal device accesses the network system.

11. The electronic device according to claim 10, wherein acquiring the resource requirement comprises: in response to a determination that the vision application has not been run by the terminal device,
acquiring a reservation for the visual resource in the network system from a network event calendar of the network system;
determining the time requirement of the resource requirement based on a reserved time; and
determining the resource requirement for the visual resource based on a reservation.

12. The electronic device according to claim 10, wherein acquiring the resource requirement comprises: in response to a determination that the vision application has been run by the terminal device,
determining the time requirement of the resource requirement based on the current time;
acquiring a historical state of a resource occupied by the vision application during a historical time period, the resource comprising any one of a computing resource, a storage resource, and a bandwidth resource; and
determining the resource requirement based on the historical state.

13. The electronic device according to claim 12, wherein predicting the visual resource which will be called by the vision application comprises:
based on a prediction model and the historical state, determining the visual resource which will be called by the terminal device, the prediction model comprising an association relationship between a state of the resource occupied by the terminal device and the visual resource which will be called by the terminal device.

14. The electronic device according to claim 10, wherein the method further comprises: updating the edge device based on a change in the location of the access point.

15. The electronic device according to claim 10, wherein identifying the edge device further comprises:
mapping the resource requirement to a resource template corresponding to the vision application; and
identifying the edge device based on a comparison of the processing capabilities of the various edge devices with the resource template.

16. The electronic device according to claim 10, wherein the method further comprises: in response to a determination that the visual resource is updated, re-deploying the updated visual resource to the edge device.

17. The electronic device according to claim 10, wherein the visual resource comprises at least any one of the following: an application program which will be called by the vision application, and scenario data which will be loaded by the vision application, and wherein the vision application comprises at least one of the following: a virtual reality application, an augmented reality application, and a mixed reality application.

18. A computer program product that is tangibly stored on a non-transitory computer-readable medium and includes machine-executable instructions, wherein the machine-executable instructions are used to perform a method for deploying a visual resource, the method comprising:
acquiring a resource requirement of a vision application for the visual resource in a network system;
based on the resource requirement, predicting the visual resource which will be called by the vision application;
based on processing capabilities of various edge devices and the visual resource in the network system, identifying an edge device located near a terminal device in the network system, wherein the terminal device is configured to run the vision application; and
based on a time requirement in the resource requirement, deploying the visual resource to the edge device;
wherein identifying the edge device further comprises:
acquiring at least any one of a priority and a frequency of change associated with the resource requirement; and
identifying the edge device based on the at least any one of the priority and the frequency of change, and a location of an access point where the terminal device accesses the network system.

19. The computer program product according to claim 18, wherein acquiring the resource requirement comprises: in response to a determination that the vision application has not been run by the terminal device,
acquiring a reservation for the visual resource in the network system from a network event calendar of the network system;
determining the time requirement of the resource requirement based on a reserved time; and
determining the resource requirement for the visual resource based on the reservation.

20. The computer program product according to claim 18, wherein acquiring the resource requirement comprises: in response to a determination that the vision application has been run by the terminal device,
determining the time requirement of the resource requirement based on the current time;
acquiring a historical state of a resource occupied by the vision application during a historical time period, the resource comprising any one of a computing resource, a storage resource, and a bandwidth resource; and
determining the resource requirement based on the historical state.

* * * * *